United States Patent
El Batawi et al.

(10) Patent No.: US 10,347,930 B2
(45) Date of Patent: Jul. 9, 2019

(54) PERIMETER ELECTROLYTE REINFORCEMENT LAYER COMPOSITION FOR SOLID OXIDE FUEL CELL ELECTROLYTES

(71) Applicant: BLOOM ENERGY CORPORATION, Sunnyvale, CA (US)

(72) Inventors: Emad El Batawi, Sunnyvale, CA (US); Mina Touma, Sunnyvale, CA (US); Michael Gasda, Mountain View, CA (US); Vijay Palety, Mumbai (IN)

(73) Assignee: BLOOM ENERGY CORPORATION, San Jose, CA (US)

( * ) Notice: Subject to any disclaimer, the term of this patent is extended or adjusted under 35 U.S.C. 154(b) by 601 days.

(21) Appl. No.: 15/077,030

(22) Filed: Mar. 22, 2016

(65) Prior Publication Data

US 2016/0285122 A1    Sep. 29, 2016

Related U.S. Application Data

(60) Provisional application No. 62/137,433, filed on Mar. 24, 2015.

(51) Int. Cl.
*H01M 8/00* (2016.01)
*H01M 8/1246* (2016.01)
(Continued)

(52) U.S. Cl.
CPC ....... *H01M 8/1253* (2013.01); *H01M 4/8605* (2013.01); *H01M 4/881* (2013.01); *H01M 4/8828* (2013.01); *H01M 4/8889* (2013.01); *H01M 8/006* (2013.01); *H01M 8/0282* (2013.01); *H01M 8/0286* (2013.01);
(Continued)

(58) Field of Classification Search
CPC .. H01M 8/1253; H01M 8/1246; H01M 4/881; H01M 4/8828; H01M 4/8889; H01M 2008/1293; Y02E 60/525
See application file for complete search history.

(56) References Cited

U.S. PATENT DOCUMENTS

| 4,272,353 A | 6/1981 | Lawrance et al. |
| 4,426,269 A | 1/1984 | Brown et al. |

(Continued)

FOREIGN PATENT DOCUMENTS

| CN | 1667860 A | 9/2005 |
| EP | 0166445 A2 | 2/1986 |

(Continued)

OTHER PUBLICATIONS

International Search Report and Written Opinion of the International Searching Authority for International Application No. PCT/US2016/023575, dated Jul. 25, 2016, 17 pages.
(Continued)

*Primary Examiner* — Stewart A Fraser
(74) *Attorney, Agent, or Firm* — The Marbury Law Group PLLC

(57) ABSTRACT

Solid oxide fuel cells and methods for fabricating solid oxide fuel cells include an electrolyte reinforcement (ERI) layer. An ink composition including a ceramic material and a sintering aid, such as a metal or metal oxide material, is applied to select portions of a solid oxide electrolyte and sintered to form an ERI layer. The ERI layer may improve the strength and durability of the electrolyte and may facilitate bonding to a high-temperature seal.

10 Claims, 12 Drawing Sheets

(51) Int. Cl.
*H01M 8/1253* (2016.01)
*H01M 4/86* (2006.01)
*H01M 4/88* (2006.01)
*H01M 8/0282* (2016.01)
*H01M 8/0286* (2016.01)
*H01M 8/124* (2016.01)

(52) U.S. Cl.
CPC .. *H01M 8/1246* (2013.01); *H01M 2008/1293* (2013.01); *H01M 2300/0074* (2013.01); *H01M 2300/0077* (2013.01); *H01M 2300/0094* (2013.01); *Y02E 60/525* (2013.01); *Y02P 70/56* (2015.11)

(56) References Cited

U.S. PATENT DOCUMENTS

| | | |
|---|---|---|
| 4,575,407 A | 3/1986 | Diller |
| 4,686,158 A | 8/1987 | Nishi et al. |
| 4,792,502 A | 12/1988 | Trocciola et al. |
| 4,804,592 A | 2/1989 | Vanderborgh et al. |
| 4,847,173 A | 7/1989 | Mitsunnaga et al. |
| 4,898,792 A | 2/1990 | Singh et al. |
| 4,917,971 A | 4/1990 | Farooque |
| 4,925,745 A | 5/1990 | Remick et al. |
| 4,983,471 A | 1/1991 | Reichner et al. |
| 5,034,287 A | 7/1991 | Kunz |
| 5,047,299 A | 9/1991 | Shockling |
| 5,143,800 A | 9/1992 | George et al. |
| 5,169,730 A | 12/1992 | Reichner et al. |
| 5,170,124 A | 12/1992 | Blair et al. |
| 5,192,334 A | 3/1993 | Rohr et al. |
| 5,273,837 A | 12/1993 | Aitken et al. |
| 5,302,470 A | 4/1994 | Okada et al. |
| 5,312,700 A | 5/1994 | Ishida |
| 5,441,821 A | 8/1995 | Merritt et al. |
| 5,445,903 A | 8/1995 | Cable et al. |
| 5,498,487 A | 3/1996 | Ruka et al. |
| 5,501,914 A | 3/1996 | Satake et al. |
| 5,505,824 A | 4/1996 | McElroy |
| 5,527,631 A | 6/1996 | Singh et al. |
| 5,573,867 A | 11/1996 | Zafred et al. |
| 5,589,285 A | 12/1996 | Cable et al. |
| 5,601,937 A | 2/1997 | Isenberg |
| 5,686,196 A | 11/1997 | Singh et al. |
| 5,688,609 A | 11/1997 | Rostrup-Nielsen et al. |
| 5,733,675 A | 3/1998 | Dederer et al. |
| 5,741,605 A | 4/1998 | Gillett et al. |
| 5,905,000 A | 5/1999 | Yadav et al. |
| 5,922,488 A | 7/1999 | Marucchi-Soos et al. |
| 5,955,039 A | 9/1999 | Dowdy |
| 6,013,385 A | 1/2000 | DuBose |
| 6,051,125 A | 4/2000 | Pham et al. |
| 6,106,964 A | 8/2000 | Voss et al. |
| 6,224,993 B1 | 5/2001 | Hartvigsen et al. |
| 6,228,521 B1 | 5/2001 | Kim et al. |
| 6,238,816 B1 | 5/2001 | Cable et al. |
| 6,280,865 B1 | 8/2001 | Eisman et al. |
| 6,329,090 B1 | 12/2001 | McElroy et al. |
| 6,403,245 B1 | 6/2002 | Hunt |
| 6,428,920 B1 | 8/2002 | Badding et al. |
| 6,436,562 B1 | 8/2002 | DuBose |
| 6,451,466 B1 | 9/2002 | Grasso et al. |
| 6,489,050 B1 | 12/2002 | Ruhl et al. |
| 6,558,831 B1 | 5/2003 | Doshi et al. |
| 6,623,880 B1 | 9/2003 | Geisbrecht et al. |
| 6,677,070 B2 | 1/2004 | Kearl |
| 6,682,842 B1 | 1/2004 | Visco et al. |
| 6,821,663 B2 | 11/2004 | McElroy et al. |
| 6,835,485 B2 | 12/2004 | Ukai et al. |
| 6,835,488 B2 | 12/2004 | Sasahara et al. |
| 6,854,688 B2 | 2/2005 | McElroy et al. |
| 6,924,053 B2 | 8/2005 | McElroy et al. |
| 7,014,934 B2 | 3/2006 | Novak |
| 7,045,237 B2 | 5/2006 | Sridhar et al. |
| 7,045,239 B2 | 5/2006 | Doneison et al. |
| 7,150,927 B2 | 12/2006 | Hickey |
| 7,255,956 B2 | 8/2007 | McElroy et al. |
| 7,968,245 B2 | 6/2011 | Gottmann |
| 8,067,129 B2 | 11/2011 | Couse |
| 8,333,919 B2 | 12/2012 | Couse |
| 9,246,184 B1 | 1/2016 | Batawi et al. |
| 2001/0049035 A1 | 12/2001 | Haltiner, Jr. et al. |
| 2002/0028362 A1 | 3/2002 | Prediger et al. |
| 2002/0028367 A1 | 3/2002 | Sammes et al. |
| 2002/0058175 A1 | 5/2002 | Ruhl |
| 2002/0076593 A1 | 6/2002 | Helfinstine et al. |
| 2002/0098406 A1 | 7/2002 | Huang et al. |
| 2002/0106544 A1 | 8/2002 | Noetzel et al. |
| 2002/0127455 A1 | 9/2002 | Pham et al. |
| 2002/0132156 A1 | 9/2002 | Ruhl et al. |
| 2003/0059668 A1 | 3/2003 | Visco et al. |
| 2003/0162067 A1 | 8/2003 | McElroy |
| 2003/0165732 A1 | 9/2003 | McElroy |
| 2003/0196893 A1 | 10/2003 | McElroy et al. |
| 2004/0081859 A1 | 4/2004 | McElroy et al. |
| 2004/0115503 A1 | 6/2004 | Jacobson et al. |
| 2004/0191595 A1 | 9/2004 | McElroy et al. |
| 2004/0191597 A1 | 9/2004 | McElroy |
| 2004/0191598 A1 | 9/2004 | Gottmann et al. |
| 2004/0202914 A1 | 10/2004 | Sridhar et al. |
| 2004/0224193 A1 | 11/2004 | Mitlitsky et al. |
| 2005/0048334 A1 | 3/2005 | Sridhar et al. |
| 2005/0227133 A1 | 10/2005 | Gorte et al. |
| 2005/0260476 A1 | 11/2005 | Xie |
| 2006/0008682 A1 | 1/2006 | McLean et al. |
| 2006/0040168 A1 | 2/2006 | Sridhar |
| 2006/0057295 A1 | 3/2006 | Visco et al. |
| 2006/0166070 A1 | 7/2006 | Hickey et al. |
| 2006/0197264 A1 | 9/2006 | Cutler et al. |
| 2006/0231987 A1 | 10/2006 | Mukundan et al. |
| 2006/0234100 A1 | 10/2006 | Day et al. |
| 2007/0006561 A1 | 1/2007 | Brady et al. |
| 2007/0080061 A1 | 4/2007 | Gorte et al. |
| 2007/0287048 A1 | 12/2007 | Couse et al. |
| 2008/0076006 A1 | 3/2008 | Gottmann et al. |
| 2008/0096080 A1 | 4/2008 | El Batawi et al. |
| 2008/0193825 A1 | 8/2008 | Nguyyen et al. |
| 2008/0254336 A1 | 10/2008 | El Batawi |
| 2009/0136821 A1 | 5/2009 | Gottmann et al. |
| 2012/0028162 A1 | 2/2012 | Gottmann et al. |

FOREIGN PATENT DOCUMENTS

| | | |
|---|---|---|
| JP | 07065847 A | 3/1995 |
| WO | WO2004/093214 A2 | 10/2004 |
| WO | WO2005/057685 A2 | 6/2005 |
| WO | WO2006/116153 A2 | 11/2006 |

OTHER PUBLICATIONS

W. D. Callister, Jr., Materials Science and Engineering, 5$^{th}$ Edition, 1999, pp. 407-411.

Cell and Stack Construction: Low-Temperature Cells, L.G. Austin, NASA SP-120, 1967.

EG & G Services, Parsons, Inc., SAIC, Fuel Cell Handbook, 5$^{th}$ Edition, UDDOE. Oct. 2000. pp. 9-1-9-4, and 9-12-9-14.

J.M. Sedlak, J. F. Austin and A. B. LaConti, "Hydrogen Recovery and Purification Using the Solid Polymer Electrolyte Electrolysis Cell," Int. J. Hydrogen Energy, vol. 6, pp. 45-51. (1981).

Low Cost Reversible Fuel Cell System, Proceedings of the 2000 U.S. DOE Hydrogen Program Review, Jun. 15, 2000. NREL/CP-570-28890.

Low Cost, Compact Solid Oxide Fuel Cell Generator, NASA Small Business Innovation Research Program.

Low Cost, High Efficiency Reversible Fuel Cell (and Electrolyzer) Systems, Proceedings of the 2001 DOE Hydrogen Program Review NREL/CP-570-30535.

Low Cost, High Efficiency Reversible Fuel Cell Systems, Proceedings of the 2002 U.S. DOE Hydrogen Program Review, NREL/CP-610-32405.

(56) References Cited

OTHER PUBLICATIONS

Power Generation and Steam Electrolysis Characteristics of an Electrochemical Cell with a Zirconia- or Ceria-based Electrode, K. Eguchi, et al, Solid State Ionics, 86 88 (1996) 1245-1249.
Regenerative Fuel Cells for High Altitude Long Endurance Solar Powered Aircraft, F. Mitlitsky, et al, 28$^{th}$ Intersociety Energy Conversion Engineering Conference (IECEC), Jul. 28, 1993, UCRL-JC-113485.
Small, Ultra Efficient Fuel Cell Systems, Advanced Technology Program ATP 2001 Competition (Jun. 2002).
S. Park et al., Direct oxidation of hydrocarbons in a solid-oxide fuel cell, Letters to Nature, Mar. 2000, vol. 404, pp. 265-267.
S. Park et al., Tape Cast Solid Oxide Fuel Cells for the Direct Oxidation of Hydrocarbons, Journal of the Electrochemical Society, 2001, vol. 148, No. 5, pp. A443-A447.
Unitized Regenerative Fuel Cells for Solar Rechargeable Aircraft and Zero Emission Vehicles, F. Mitlitsky, et al, 1994 Fuel Cell Seminar, Sep. 6, 1994, UCRL-JC-117130.
Search Report & Written Opinion dated Oct. 6, 2009 for International Patent Application No. PCT/US2008/012671.
SIPO, Chinese Application No. CN2008-0115166.0, Office Action dated Feb. 21, 2013.
SIPO, Chinese Application No. CN2008-0115166.0 Office Action dated Jul. 11, 2012.
U.S. Appl. No. 60/996,352, "Electrolyte Supported Cell Designed for Longer Life and Higher Power," filed Nov. 13, 2007.
U.S. Appl. No. 61/129,759, "Electrolyte Supported Cell Designed for Longer Life and Higher Power," filed Jul. 17, 2008.
U.S. Appl. No. 61/129,882, "Electrolyte Supported Cell Designed for Longer Life and Higher Power," filed Jul. 25, 2008.
U.S. Appl. No. 61/539,045, "Electrolyte Supported Cell Designed for Longer Life and Higher Power," filed Sep. 26, 2011.
U.S. Appl. No. 60/852,396, "Electrolyte Supported Cell Designed for Longer Life and Higher Power," filed Oct. 18, 2008.
U.S. Appl. No. 14/969,441, filed Dec. 15, 2015, Specification and drawings.
International Preliminary Report on Patentability from the International Bureau for International Patent Application No. PCT/US2016/023575, dated Oct. 5, 2017, 14 pages.

| Powder name | Composition | wt% |
|---|---|---|
| 3YSZ | 3YSZ | 57.01 |
| Alumina | Al2O3 | 19.00 |
| organic vehicle: solvents, binders, plasticizers, and dispersants | | 23.98 |

| Powder name | Composition | wt% |
|---|---|---|
| 3YSZ | 3YSZ | 55.58 |
| Alumina | Al2O3 | 18.80 |
| Copper Oxide II | CuO | 1.20 |
| Tin Oxide II | SnO2 | 1.19 |
| organic vehicle: solvents, binders, plasticisizers, and dispersants | | 23.23 |

PERIMETER ELECTROLYTE REINFORCEMENT LAYER COMPOSITION FOR SOLID OXIDE FUEL CELL ELECTROLYTES

FIELD

The present invention is generally directed to fuel cell components, and to solid oxide fuel cell materials in particular.

BACKGROUND

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell, while a fuel flow is passed through the anode side of the fuel cell. The oxidizing flow is typically air, while the fuel flow can be a hydrocarbon fuel, such as methane, natural gas, propane, ethanol, or methanol. The fuel cell, operating at a typical temperature between 750° C. and 950° C., enables combination of the oxygen and free hydrogen, leaving surplus electrons behind. The excess electrons are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Typically, SOFCs are fabricated either as electrolyte supported, anode supported, or cathode supported, depending on which of the three functional components of the cell provides structural support. In planar electrolyte supported SOFC designs, the anode and cathode electrodes are painted as an ink onto the opposite surfaces of a planar ceramic electrolyte. However, weakness in structural integrity, particularly at or around the fuel inlet and outlet riser openings, might arise in these designs under certain loading conditions.

Ceramics are known to exhibit fracture before any plastic deformation can occur in response to an applied tensile load, such as during thermal cycling. Fracture in ceramics usually originates at preexisting defects, such as microcracks, internal pores, and grain corners.

SUMMARY

An embodiment method includes providing a solid oxide electrolyte having a first major surface and a second major surface opposite the first major surface, applying an ink composition including a ceramic material and a sintering aid over a portion of at least one of the first major surface and the second major surface of the solid oxide electrolyte, and sintering the ink composition to form an electrolyte reinforcement (ERI) layer over at least one of the first major surface and the second major surface of the solid oxide electrolyte.

Another embodiment method includes a method for manufacturing a solid oxide fuel cell, comprising providing a solid oxide electrolyte having a first major surface and a second major surface opposite the first major surface, providing an anode electrode ink on the first major surface of the solid oxide electrolyte, and providing a cathode electrode ink on the second major surface of the solid oxide electrolyte. The method also includes applying reinforcement layer ink composition comprising a ceramic material and a sintering aid over a portion of at least one of the first major surface and the second major surface of the solid oxide electrolyte, and co-sintering the reinforcement layer ink composition with at least one of the anode electrode ink or the cathode electrode ink to form an electrolyte reinforcement layer over at least one of the first major surface and the second major surface of the solid oxide electrolyte and to form at least one of the anode electrode or the cathode electrode.

Another embodiment method includes a method for manufacturing a solid oxide fuel cell, comprising providing a solid oxide electrolyte having a first major surface and a second major surface opposite the first major surface, providing a glass or glass-ceramic seal precursor material containing an ink composition comprising a ceramic material and a sintering aid that is located on a surface of the seal or at least partially mixed with the seal precursor material, applying the seal over at least one of the first major surface and the second major surface of the solid oxide electrolyte such that at least part of the ink composition contacts at least one of the first and the second major surface of the solid oxide electrolyte, and sintering the ink composition to form an electrolyte reinforcement layer over at least one of the first major surface and the second major surface of the solid oxide electrolyte.

In various embodiments, the ink composition may include stabilized zirconia (e.g., yttria- or scandia-stabilized zirconia) and alumina, and the at least one sintering aid may include a metal or metal oxide, such as cobalt (II) oxide, copper (II) oxide and/or tin (II) oxide.

Another embodiment relates to a solid oxide fuel cell that includes a solid oxide electrolyte, a cathode electrode over a first major surface of the electrolyte, an anode electrode over a second major surface of the electrolyte opposite the first major surface, and an electrolyte reinforcement layer over a portion of at least one of the first major surface and the second major surface of the solid oxide electrolyte, where the electrolyte reinforcement layer includes a ceramic material and at least one of a metal and a metal oxide sintering aid.

DETAILED DESCRIPTION OF THE EMBODIMENTS

Figure 1:
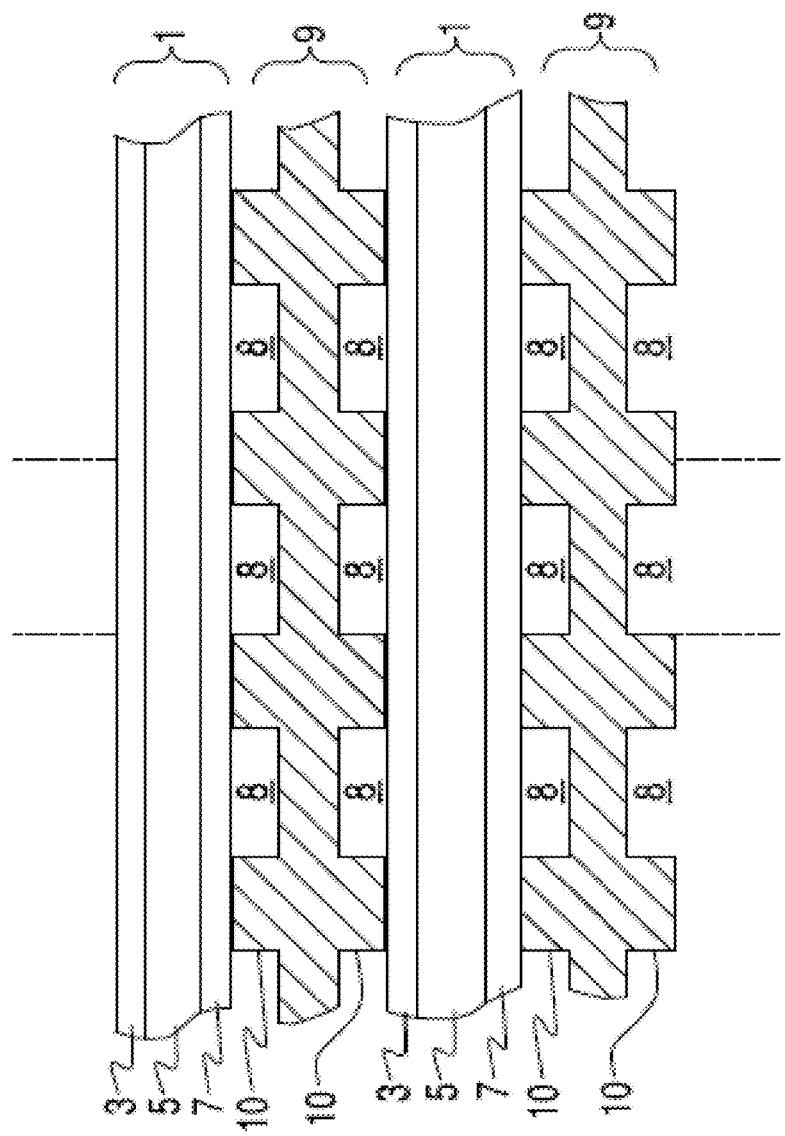
FIG. 1 illustrates a side cross sectional view of a SOFC of an embodiment of the invention.

The accompanying drawings, which are incorporated herein and constitute part of this specification, illustrate example embodiments of the invention, and together with the general description given above and the detailed description given below, serve to explain the features of the invention.

Various embodiments include ink compositions for reinforcing and improving the strength of a solid oxide electrolyte. The ink composition may be applied to selective areas of the electrolyte, such as around the perimeter of the electrolyte and at least partially surrounding the fuel riser openings, and may be sintered at elevated temperature (e.g., 1150° C. or greater, such as approximately 1200° C.) to form an electrode reinforcing (ERI) layer on the electrolyte. In various embodiments, the ink composition for the ERI layer may be co-fired with the anode and/or cathode electrodes of the SOFC. An electrolyte or SOFC having an embodiment ERI layer may have a higher fracture toughness value than the identical electrolyte or SOFC without the ERI layer. The ERI layer according to various embodiments may also improve the bonding strength to a fuel cell seal, such as a glass or glass-ceramic seal.

In embodiments, the ink composition used to form the ERI layer includes at least one ceramic material and at least one sintering aid. The ink composition may also include suitable organic solvent(s), organic binder(s), organic plasticizers and/or organic dispersant(s). The ceramic material of the ink composition may include a stabilized zirconia, such as yttria-stabilized zirconia (YSZ) and/or scandia-stabilized zirconia (SSZ), and alumina. The sintering aid of the ink composition may include a metal or metal oxide dopant, such as one or more of Ti, Mo, W, Mg, Hf, Rh, Co, Ni, Fe, Mn, Cu and Sn and oxides of these metals. The ink composition may be applied to select areas of the electrolyte (e.g., around the periphery of the electrolyte and/or at least partially around riser openings extending through the electrolyte) and sintered at elevated temperature to burn out the organic solvent(s), binder(s), plasticizers, and/or dispersant(s) and form a multi-component ERI layer including the at least one ceramic material and the at least one metal and/or metal oxide sintering aid material bonded to the electrolyte.

In various embodiments, the ink composition may include about 0.1 to about 75 wt % (e.g., 45-60 wt %) of stabilized zirconia, about 0.1 to about 50 wt % (e.g., 15-25 wt %) of alumina, about 0.1 to about 24 wt % (e.g., 1-5 wt %) of the sintering aid (e.g., metal or metal oxide material), about 1 to about 50 wt % of organic solvent(s), about 1 to about 10 wt % of organic binder(s) and about 1 to about 5 wt % of organic dispersant(s) (e.g., 15-30 wt % organics).

In one embodiment, an ink composition as described above may include about 0.1 to about 75 wt % (e.g., 45-60 wt %) of yttria stabilized zirconia (YSZ), about 0.1 to about 50 wt % (e.g., 15-25 wt %) of alumina, about 0.1 to about 12 wt % of a cobalt oxide sintering aid, and about 1 to about 50 wt % of organic solvent(s), about 1 to about 10 wt % of organic binder(s) and about 1 to about 5 wt % of organic dispersant(s) (e.g., 15-30 wt % organics). This ink composition may form a multi-component ERI layer comprising YSZ, alumina and cobalt oxide.

In another embodiment, and ink composition as described above may include about 0.1 to about 75 wt % (e.g., 45-60 wt %) of yttria stabilized zirconia (YSZ), about 0.1 to about 50 wt % (e.g., 15-25 wt %) of alumina, about 0.1 to about 12 wt % of a sintering aid, such as about 0.1 to about 12 wt % (e.g., 0.5 to 2.5 wt %) copper oxide sintering aid and/or about 0.1 to about 12 wt % (e.g., 0.5 to 2.5 wt %) of a tin oxide sintering aid, and about 1 to about 50 wt % of organic solvent(s), about 1 to about 10 wt % of organic binder(s) and about 1 to about 5 wt % of organic dispersant(s) (e.g., 15-30 wt % organics).

In another embodiments, the sintered electrolyte layer composition may include about 0.1 to about 80 wt % (e.g., 50-75 wt %) of stabilized zirconia, about 0.1 to about 60 wt % (e.g., 20-45 wt %) of alumina, about 0.1 to about 30 wt % (e.g., 1-5 wt %) of the sintering aid (e.g., metal or metal oxide material) after the organic components are removed during prior annealing steps (e.g., debindering and/or sintering annealing steps).

A seal, such as a high temperature glass or glass-ceramic seal, may be provided over one or both major surfaces of the fuel cell electrolyte, and may be formed in contact with the ERI layer. The ERI containing a metal or metal oxide sintering aid may improve seal compatibility and wettability during setting and formation of the seal. The seal may thus have a higher bonding strength to the SOFC. In embodiments, at least one constituent material of the seal, such as silicon, may be present in the ERI layer.

In one embodiment, a glass or glass-ceramic seal precursor material may be provided over the ink composition and/or the sintered ERI layer such that at least one constituent material of the seal (e.g., silicon) diffuses into the ERI layer during the formation of the seal. Alternately, the ink composition may be provided on the seal precursor material and/or may be intermixed with the seal precursor material, and the ink composition with the seal material may be provided on a surface of the electrolyte. The ink composition and seal precursor material may be co-sintered to form an ERI layer on the electrolyte and a glass or glass-ceramic seal on the ERI layer, where the ERI layer comprises at least one constituent material of the seal (e.g., silicon).

FIG. 1 is a cross-section view of a SOFC stack. Fuel cell stacks are frequently built from a multiplicity of SOFC's in the form of planar elements, tubes, or other geometries. Fuel and air has to be provided to the electrochemically active surface, which can be large. As shown in FIG. 1, one component of a fuel cell stack is the so called gas flow separator (referred to as a gas flow separator plate in a planar stack) 9 that separates the individual cells in the stack. The gas flow separator plate separates fuel flowing to the fuel electrode (i.e. anode 3) of one cell in the stack from oxidant, such as air, flowing to the air electrode (i.e. cathode 7) of an adjacent cell in the stack. The fuel may be a hydrocarbon fuel, such as natural gas for internally reforming cells, or a reformed hydrocarbon fuel comprising hydrogen, water vapor, carbon monoxide and unreformed hydrocarbon fuel for externally reforming cells. The separator 9 contains gas flow passages or channels 8 between the ribs 10. Frequently, the gas flow separator plate 9 is also used as an interconnect which electrically connects the fuel electrode 3 of one cell to the air electrode 7 of the adjacent cell. In this case, the gas flow separator plate which functions as an interconnect is made of or contains electrically conductive material, such as a Cr—Fe alloy. An electrically conductive contact layer, such as a metal foil or thin sheet, perforated foil or thin sheet, mesh, or composite of these, may be provided between the anode electrode and the interconnect. A conductive ceramic paste, such as LSM paste, may be provided between the cathode electrode and the next adjacent interconnect of the stack. FIG. 1 shows that the lower SOFC 1 is located between two gas separator plates 9.

Furthermore, while FIG. 1 shows that the stack comprises a plurality of planar or plate shaped fuel cells, the fuel cells may have other configurations, such as tubular. Still further, while vertically oriented stacks are shown in FIG. 1, the fuel cells may be stacked horizontally or in any other suitable direction between vertical and horizontal.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity. In this case, the electrical power output from both stacks cannot be separately controlled.

Any suitable fabrication method may be used for forming the SOFCs of the embodiments of the invention. The electrodes 3, 7 may be formed by a screen printing method or by other suitable methods. For the ink-printed electrodes, the anode electrode 3 (e.g., nickel and ceramic phase (e.g., doped ceria and/or stabilized zirconia) cermet ink (e.g., samaria doped ceria) and cathode electrode (e.g., lanthanum strontium manganite (LSM)) are applied to opposite sides of the electrolyte (e.g., scandia stabilized zirconia, which may contain one or more of cerium, yttrium, and ytterbium (e.g., cerium and yttrium, or cerium and ytterbium))) followed by sintering.

Figure 2A:
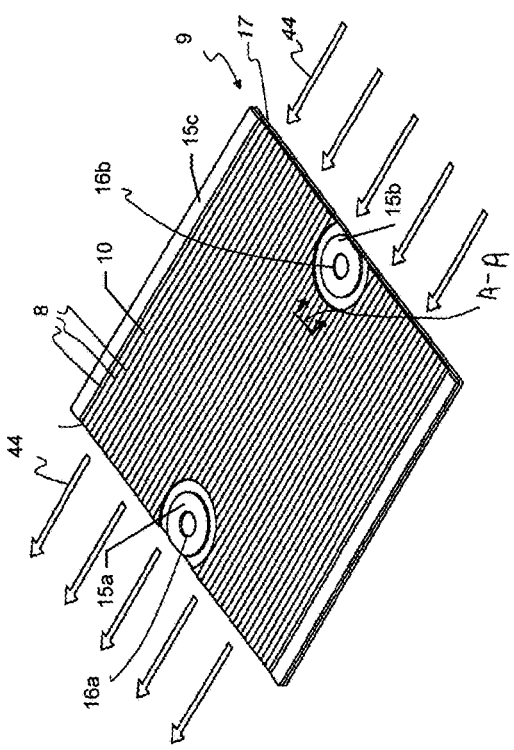
FIG. 2A is a perspective view of a cathode side of an interconnect.
Figure 2B:
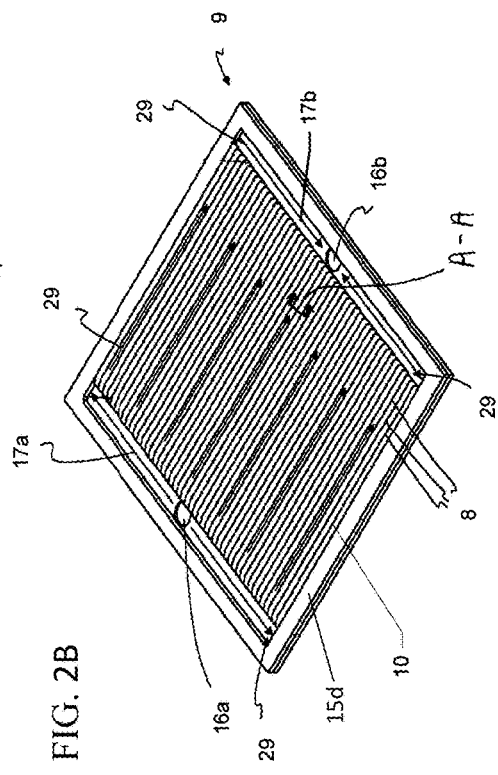
FIG. 2B is a perspective view of an anode side of an interconnect.

FIGS. 2A and 2B show, respectively, top and bottom views of an interconnect 9. The portions of interconnect 9 shown in side cross-section in FIG. 1 are provided along lines A-A in FIGS. 2A and 2B. The interconnect 9 contains gas flow passages or channels 8 between ribs 10. The interconnect 9 in this embodiment includes at least one riser channel 16a for providing fuel to the anode-side of the SOFC 1, as illustrated by arrow 29. The riser channel 16a generally comprises a fuel inlet riser opening or hole that extends through at least one layer of the fuel cells and interconnects in the stack. As illustrated in FIG. 2B, the fuel can flow through the inlet riser channel 16a to the anode-side of each fuel cell. There, the fuel can collect in an inlet plenum 17a (e.g., a groove in the interconnect's surface), then flow over the fuel cell anode 3 through gas flow channels 8 formed in the interconnect 9 to an outlet plenum 17b and then exit through a separate outlet riser channel 16b.

The cathode side, illustrated in FIG. 2A, can include gas flow passages or channels 8 between ribs 10 which direct air flow 44 over the cathode electrode of the fuel cell. Seals 15a, 15b can seal the respective risers 16a, 16b on the cathode-sides of the interconnect and fuel cell to prevent fuel from reaching the cathode electrode of the fuel cell. The seals may have a donut or hollow cylinder shape as shown so that the risers 16a, 16b extend through the hollow middle part of the respective seals 15a, 15b. The seals 15a, 15b may be located on an elevated flat surface of the interconnect surrounding the risers 16a, 16b and may contact against the flat surface of the adjacent SOFC 1. Strip seals 15c may extend along two opposing sides of the cathode-facing surface of the interconnect 9 to seal the interconnect 9 to the adjacent SOFC 1. The other opposing sides of the cathode-facing surface of the interconnect 9 may lack seals (i.e., are not sealed to the adjacent SOFC 1) to enable air 44 to enter and exit the channels 8. As shown in FIG. 2B, a window seal 15d may extend around the entire periphery of the anode-facing surface of the interconnect 9 to seal the interconnect 9 to the adjacent fuel cell and prevent air from reaching the anode electrode of the fuel cell. The seals 15a-15d may be comprised of any suitable high-temperature seal material, such as a glass or glass-ceramic material.

In FIGS. 2A and 2B, the riser channel openings 16a, 16b are shown as fuel inlet and fuel outlet openings in the interconnect 9. This interconnect is configured for a fuel cell stack which is internally manifolded for fuel, in which the fuel travels through the stack through fuel riser channels which are formed by mated openings through the stacked interconnects and fuel cells. However, if desired, the interconnect 9 may be configured for a stack which is externally manifolded for fuel. In this case, the top and bottom edges of the interconnect 9 shown in FIG. 2B would function as fuel inlet and outlet, respectively, for the fuel which flows externally to the stack. Furthermore, the interconnect 9 shown in FIGS. 2A and 2B is configured for a stack which is externally manifolded for air. However, additional openings through the interconnect may be formed, such as on the left and right sides of the interconnect, for the interconnect to be configured for a stack which is internally manifolded for air.

Figure 3:
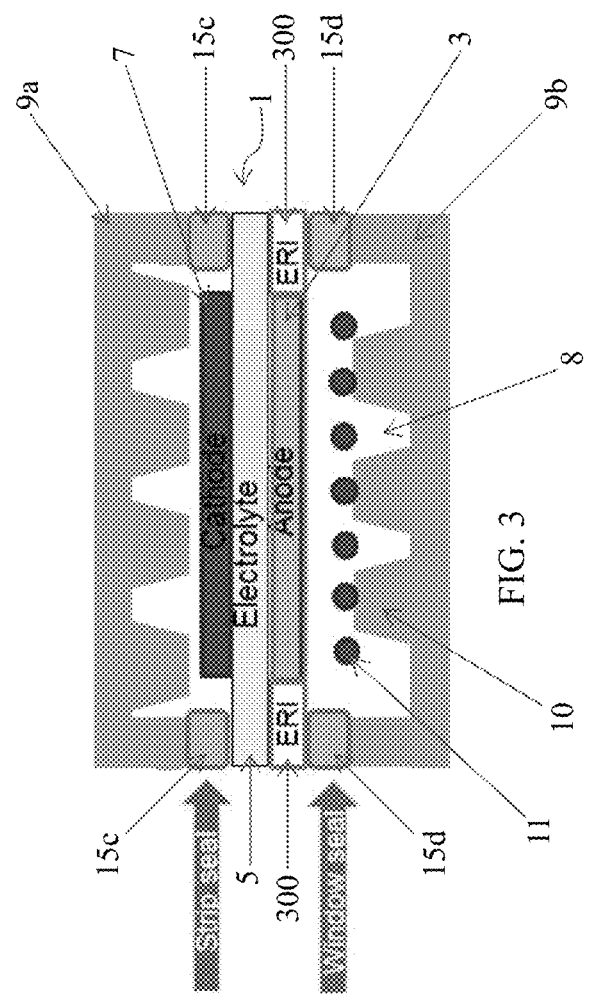
FIG. 3 illustrates a side cross-sectional view of a SOFC stack of the embodiments of the invention, where the ERI is located on top of a seal.

FIG. 3 is a cross-section schematic view of a solid oxide fuel cell 1 located between two interconnects 9a, 9b. The fuel cell 1 is similar to the fuel cell described above, and includes a solid oxide electrolyte 5, a cathode electrode 7 located over a first major surface of the electrolyte 5 and an anode electrode 3 located over a second major surface of the electrolyte 5 opposite the cathode electrode 7. The fuel cell 1 in this embodiment includes an electrolyte reinforcement layer 300 on the electrolyte 5, where the electrolyte reinforcement layer is a multi-component material including ceramic material (e.g., stabilized zirconia and alumina) and a metal or metal oxide material (e.g., cobalt oxide, copper oxide and/or tin oxide). The electrolyte reinforcement layer 300 in this embodiment extends around the periphery of the electrolyte 5 on the anode side of the electrolyte 5. It will be understood that an electrolyte reinforcement layer 300 may also be located on the cathode side of the electrolyte 5, instead of or in addition to the anode side of the electrolyte.

An anode contact layer or mesh 11 (e.g., Ni layer or mesh) may be located between the anode 3 and ribs 10 of interconnect 9b.

Strip seals 15c (e.g., glass or glass-ceramic fuel cell seals) seal the cathode-side of the fuel cell 1 to a first interconnect 9a, as described above with reference to FIG. 2A, and a window seal 15d (e.g., glass or glass-ceramic fuel cell seal) seals the anode-side of the fuel cell 1 to a second interconnect 9b, as described above with reference to FIG. 2B. In this embodiment, the window seal 15d is located on the electrolyte reinforcement layer 300, and at least one component of the seal 15d (e.g., silicon) diffuses into or otherwise infiltrates the electrolyte reinforcement layer 300. This may improve the bonding of the seal 15d to the fuel cell 1.

Figure 4:
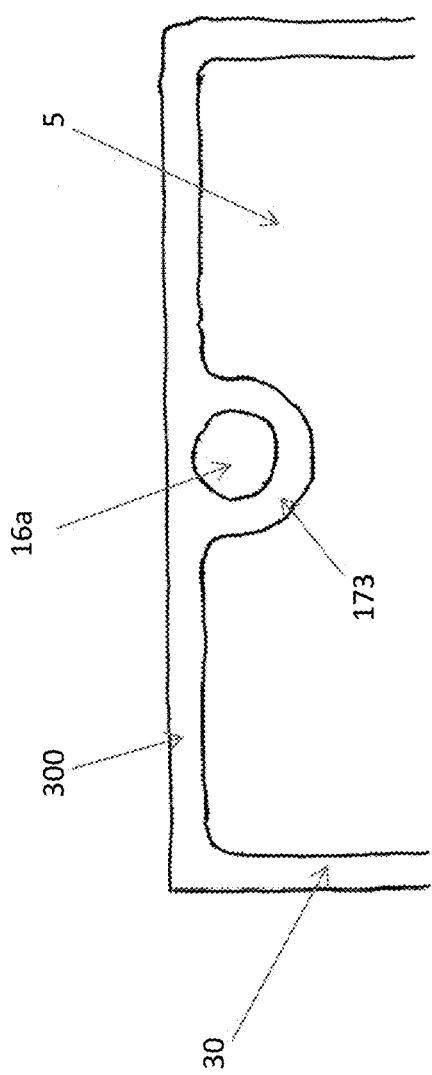
FIG. 4 illustrates a top cross-sectional view of a SOFC of the embodiments of the invention, where the ERI is located around the periphery of the electrolyte and around the perimeters of at least one fuel inlet or fuel outlet riser opening in the electrolyte.

FIG. 4 illustrates a top cross-sectional view of an electrolyte 5 where the electrolyte reinforcement layer 300 is located around the periphery 30 of the electrolyte 5 and around the perimeter 173 of the fuel inlet riser opening 16a in the electrolyte. The electrolyte reinforcement layer 300 may partially or fully surround the fuel inlet or outlet riser openings, and the amount and layers of electrolyte reinforcement material applied to the riser openings may vary. Further, the electrolyte reinforcement layer 300 may be provided to various areas of the electrolyte other than those shown in FIGS. 3 and 4. The width of the reinforcement layer 300 (i.e., the width extends in a direction in the plane parallel to the major surface of the electrolyte 5) around the periphery 30 of the electrolyte 5 may be about 1-10 mm, such as 3-5 mm.

Figure 5A:
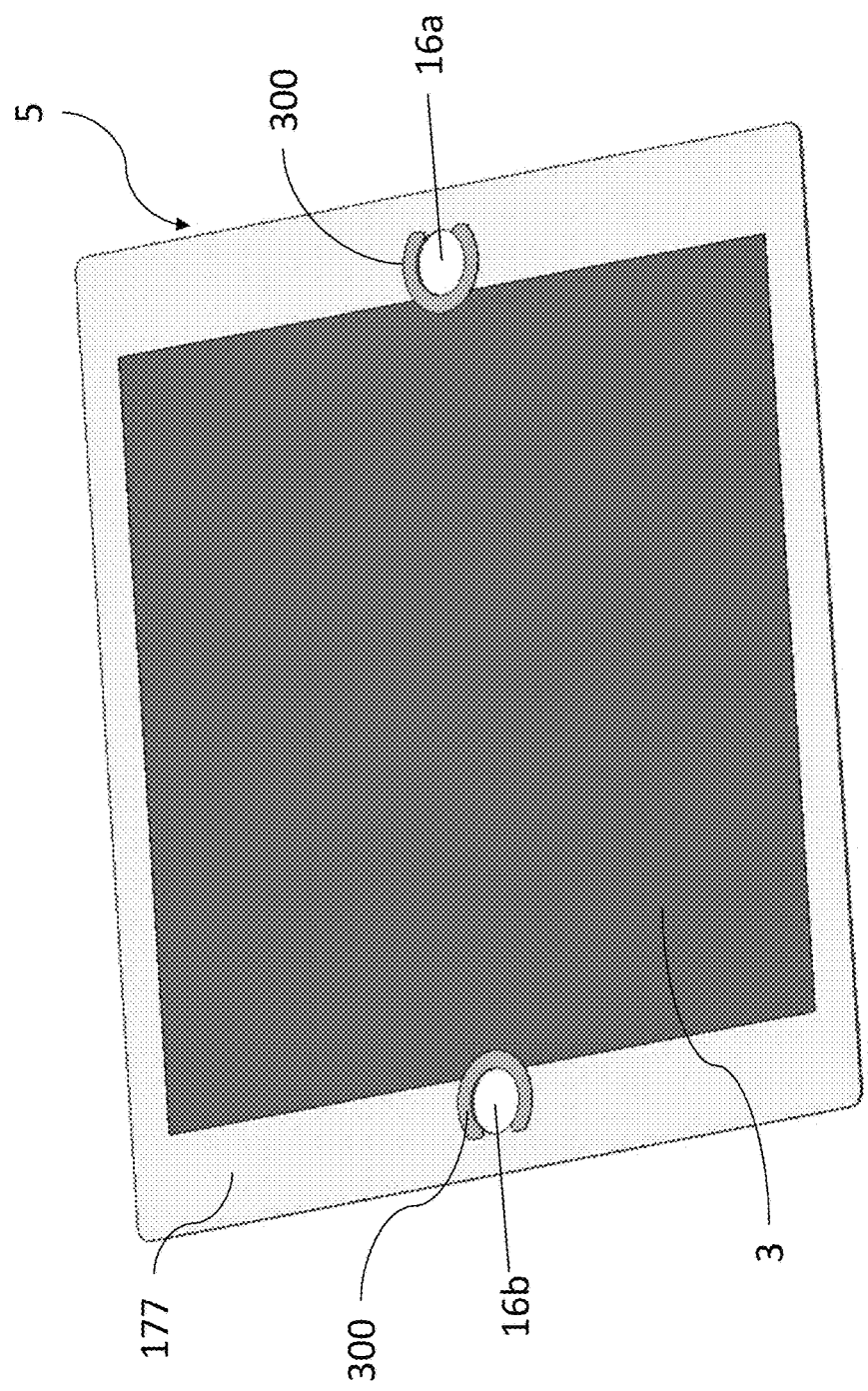
FIG. 5A illustrates a top view of a hole-reinforced electrolyte of a SOFC according to an embodiment of the invention.
Figure 5B:
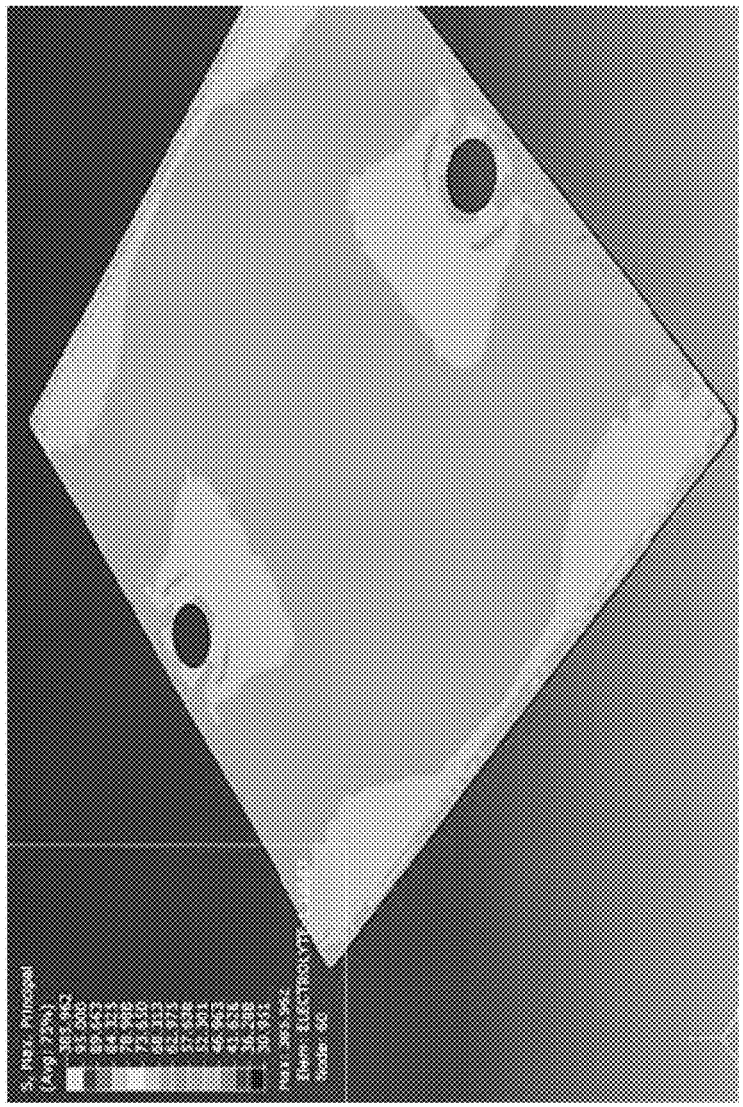
FIG. 5B is a top view computational image of a simulated electrolyte undergoing a thermal load of about 600° C. to about 800° C.

FIG. 5A illustrates two electrolyte reinforcement layers 300 that at least partially surround the circumference of the fuel riser openings 16a, 16b in an electrolyte 5. The width of the reinforcement layer 300 around the circumference of the fuel riser openings 16a, 16b may be about 1-10 mm, such as 3-5 mm. The riser openings 16a, 16b are located on an inactive region 177 of the electrolyte 5, which is located around the periphery of the anode electrode 3. In this embodiment, the anode electrode 3 may be an ink-printed electrode. Alternately, the anode electrode 3 may comprise a porous ceramic layer infiltrated with catalyst material. Preferably, the reinforcing layers 300 provide improved mechanical properties (e.g., fracture strength, hardness, fatigue strength, toughness) to the electrolyte 5 in the regions surrounding the riser openings 16a, 16b where electrolyte failure is most likely to occur, thereby extending the life of the electrolyte 5. As shown in FIG. 5B, the areas of highest stress have been identified using finite element analysis ("FEA") on a simulated electrolyte undergoing a thermal load of about 600° C. to about 800° C.

As shown in FIG. 5A, the reinforcement layers 300 are located on the inactive region 177 of the electrolyte 5. The thickness of the electrolyte 5 plus the reinforcing layer 300 is thicker than that of the portion of the inactive region 177 not containing the reinforcement layer 300 and may be thicker than the portion of the electrolyte 5 covered by the anode 3. In embodiments, the reinforcing layer 300 may reinforce the electrolyte by being made of a tougher ceramic material than the electrolyte instead of or in addition to reinforcing the electrolyte by a difference in thickness. Thus, the difference in thickness can be greater than about 5 μm, such as about 5 μm to about 150 μm, including about 5 μm to about 125 μm, for example about 5 μm to about 20 μm, (e.g., about 10 μm to about 12 μm).

The reinforcing layer(s) 300 may be in the shape of a semicircle, horseshoe, crescent, or U-shaped. In embodiments, the electrolyte reinforcing layers 300 formed on the anode side of the electrolyte may not form a complete circle around the perimeter of the respective riser opening 16a, 16b, but may be partially open (e.g., contain a channel 179 shown in FIGS. 5C-5E) to allow fuel from the anode side to enter and exit the inlet 16a and outlet 16b openings, respectively. The electrolyte reinforcing layer(s) 300 may be located on either one or both sides of the electrolyte 5. In an embodiment, the electrolyte reinforcing layer(s) 300 may be located only on the anode (top) side of the electrolyte 5, while seals (i.e., cylindrical seals 15a, 15b as shown in FIG. 2A) may be located on the cathode (bottom) side entirely around the circumference of each riser opening to prevent mixing of fuel and air streams. The layers 300 may a width is about 1-10 mm, such as 3-5 mm.

Figure 5C:
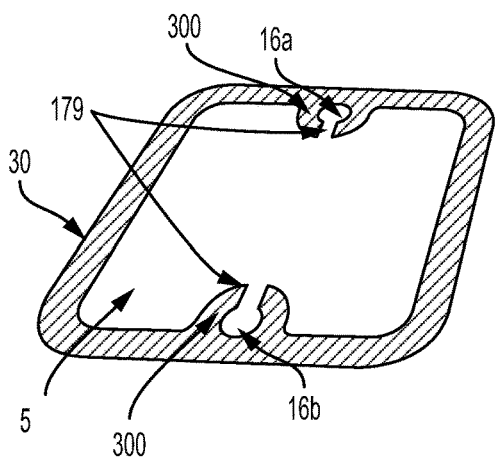
FIGS. 5C-5H are schematic top views of an electrolyte containing various configurations of ceramic support layer according to embodiments of the invention.

As shown in FIG. 5C, the electrolyte reinforcement layer 300 may form a continuous shape around perimeter 30 of the anode side of the electrolyte 5 and at least partially around the fuel riser openings 16a, 16b. Alternatively, multiple discrete electrolyte reinforcement layers 300 may be formed on the electrolyte surface, such as at least partially surrounding the riser openings 16a, 16b, as shown in FIGS. 5D and 5E. The layers 300 may have a curved or linear profile at the edge of the electrolyte, as shown in FIGS. 5D and 5E, respectively.

Figure 5F:
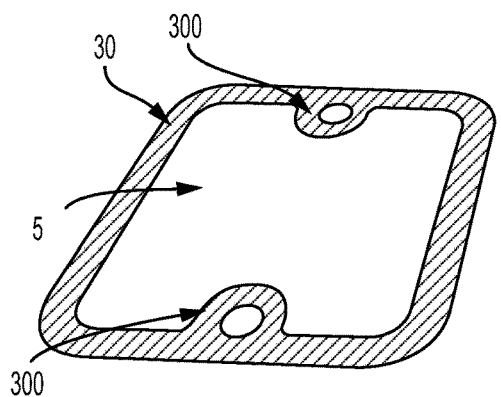
Figure 5D:
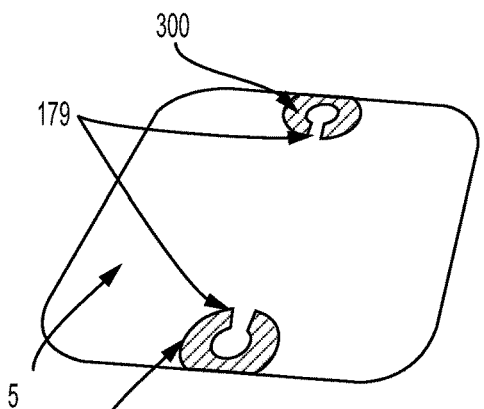
Figure 5G:
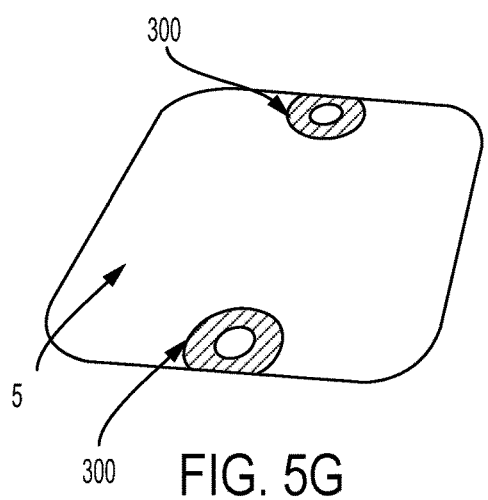
Figure 5E:
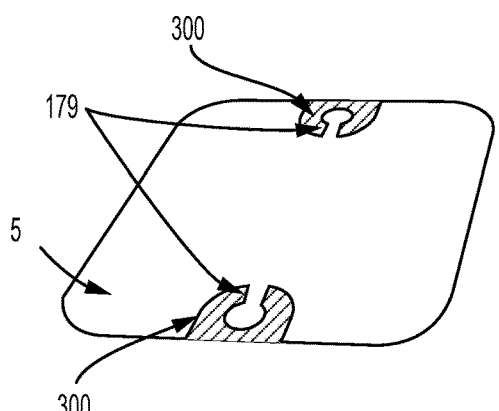
Figure 5H:
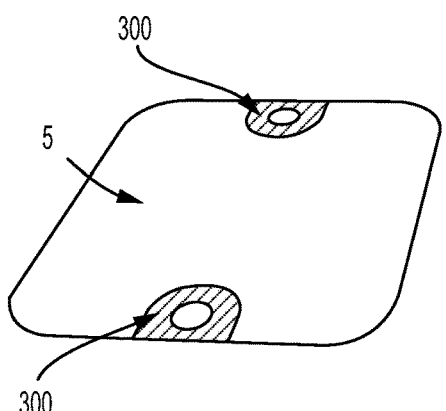

Alternately or in addition, electrolyte reinforcement layer(s) 300 may be formed on the cathode side of the electrolyte 5 as shown in FIGS. 5F-5H. In this case, the electrolyte reinforcement layers 300 may completely encircle (e.g., cover the entire perimeter of) the riser openings 16a, 16b (i.e., the channel 179 is omitted). The electrolyte reinforcement layer 300 may form a continuous shape around the perimeter 30 of the cathode side of the electrolyte 5, as shown in FIG. 5F. Alternatively, multiple discrete electrolyte reinforcement layers 300 may be formed on the cathode side of the electrolyte 5, such as surrounding the riser openings 16a, 16b, as shown in FIGS. 5G and 5H. The layers 300 may have a curved or linear profile at the edge of the electrolyte, as shown in FIGS. 5G and 5H, respectively. The layers 300 may have a width of about 1-10 mm, such as 3-5 mm.

An electrolyte reinforcement layer 300 of any of the above embodiments may be formed by applying an ink composition comprising a ceramic material (e.g., stabilized zirconia and alumina) and a sintering aid (e.g., a metal or metal oxide material) to the specified portions of the electrolyte 5, and sintering the ink composition at an elevated temperature (e.g., greater than about 1150° C., such as about 1175° C.-1400° C., such as about 1200° C.-1250° C.) to form the electrolyte reinforcement layer 300. The ink composition may be applied to specific portions of the electrolyte using any suitable process, such as by screen printing, spray coating, sputtering, e-beam deposition, painting, dip coating or electrophoretic deposition. In embodiments, the ink composition may be incorporated into a tape casting process used for manufacturing the solid oxide electrolyte 5. For example, the ink composition may be sintered together with a tape-cast solid oxide ceramic material to form the solid oxide electrolyte 5 having at least one electrolyte reinforcement layer 300.

Non-Limiting Examples

Figures 6A, 6B:
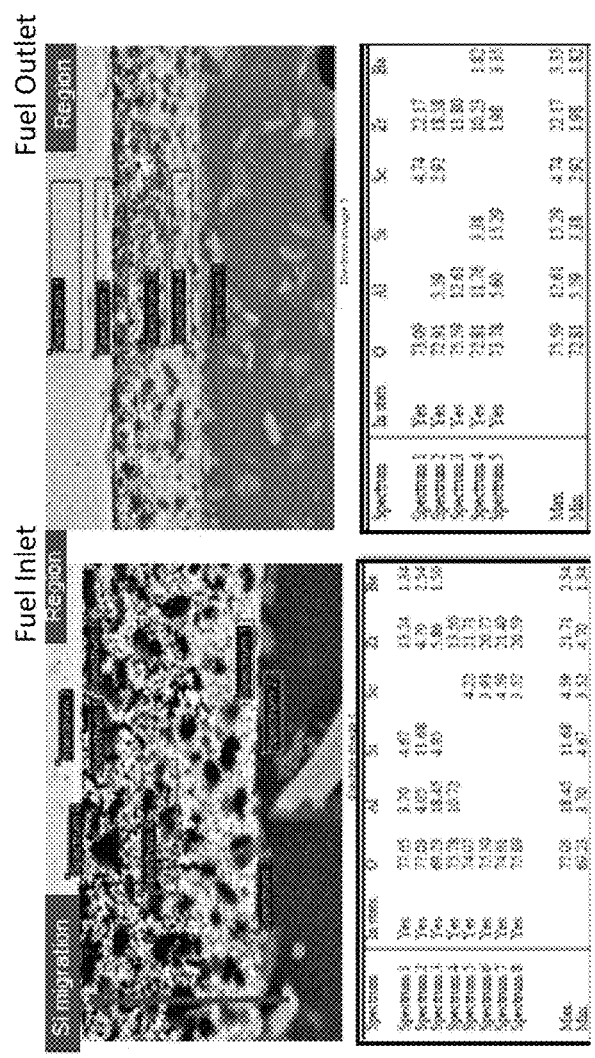
FIGS. 6A, 7A, and 8A are tables of compositions of ERI ink.
FIGS. 6B, 7B, and 8B are SEM images of the ERI ink compositions of FIGS. 6A, 7A, and 8A.

A first comparative example (i.e., Example 1) of an ink composition for forming an electrolyte reinforcement layer on a thin 115 μm electrolyte is shown in FIG. 6A. In the Example 1 ink composition, yttria-stabilized zirconia (YSZ) is 57.01 weight percent of the ink, aluminum oxide ($Al_2O_3$) is 19.00 weight percent of the ink, and the balance of the ink composition (23.98 wt %) includes various organic solvents, binders, plasticizers and dispersants.

The upper left and right quadrants of FIG. 6B show close up and expanded view SEM images of the microstructure of the electrolyte reinforcement (ERI) layers formed at respective fuel inlet and fuel outlet riser opening regions on a solid oxide electrolyte using the Example 1 ink composition. The ERI layers are located between the electrolyte (upper light colored region) and a glass seal (lower dark colored region). The vertical arrow in the top left quadrant shows the direction of silicon infiltration from the seal into the ERI layer which improves the wetability and bonding of the ERI layer to the seal.

The lower left and right quadrants of FIG. 6B are spectra from energy-dispersive X-ray spectroscopy (EDX) analysis of points in the layers in the respective upper quadrants. For example, the lower left quadrant shows the EDX spectra from eight points shown in the upper left quadrant. Spectra 1, 4, 5 and 8 are taken at various locations in the ERI layer, spectra 2 and 3 are taken at the glass seal—ERI layer interface and spectra 6 and 7 are taken in the SSZ electrolyte. As can be seen in spectrum 1, some silicon from the seal infiltrates the lower part of the ERI layer adjacent to the seal. However, as can be seen in spectrum 5 and 8, silicon does not reach the upper part of the ERI layer adjacent to the SSZ electrolyte.

The lower right quadrant shows the EDX spectra from five points shown in the upper right quadrant. Spectra 3 and 4 are taken at various locations in the ERI layer, spectrum 5 is taken at the glass seal—ERI layer interface and spectra 1 and 2 are taken in the SSZ electrolyte. As can be seen in spectra 3 and 4, some silicon from the seal infiltrates the lower part ERI layer but not the upper part of the ERI layer.

Figure 7A:
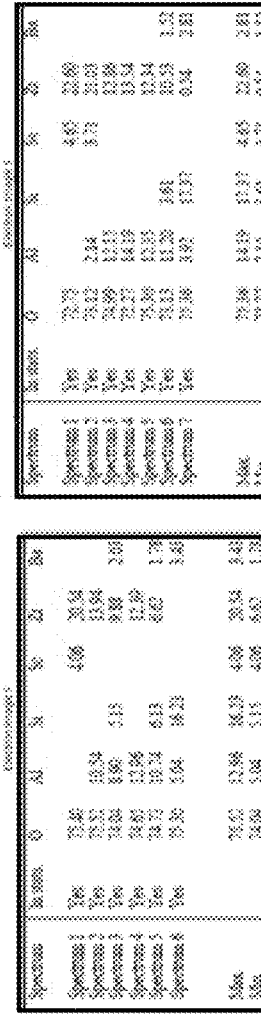

A second example (i.e., Example 2) of an embodiment ink composition for forming an electrolyte reinforcement layer is shown in FIG. 7A. The Example 2 ink composition includes 55.19 wt % YSZ, 18.36 wt % aluminum oxide, and 3.15 wt % cobalt (II) oxide powder, with the balance (23.30 wt %) including various solvents, binders, plasticizers and dispersants. Thus, the Example 2 ink composition differs from the Example 1 composition by the addition of a metal oxide (i.e., cobalt oxide) sintering aid.

Figure 7B:
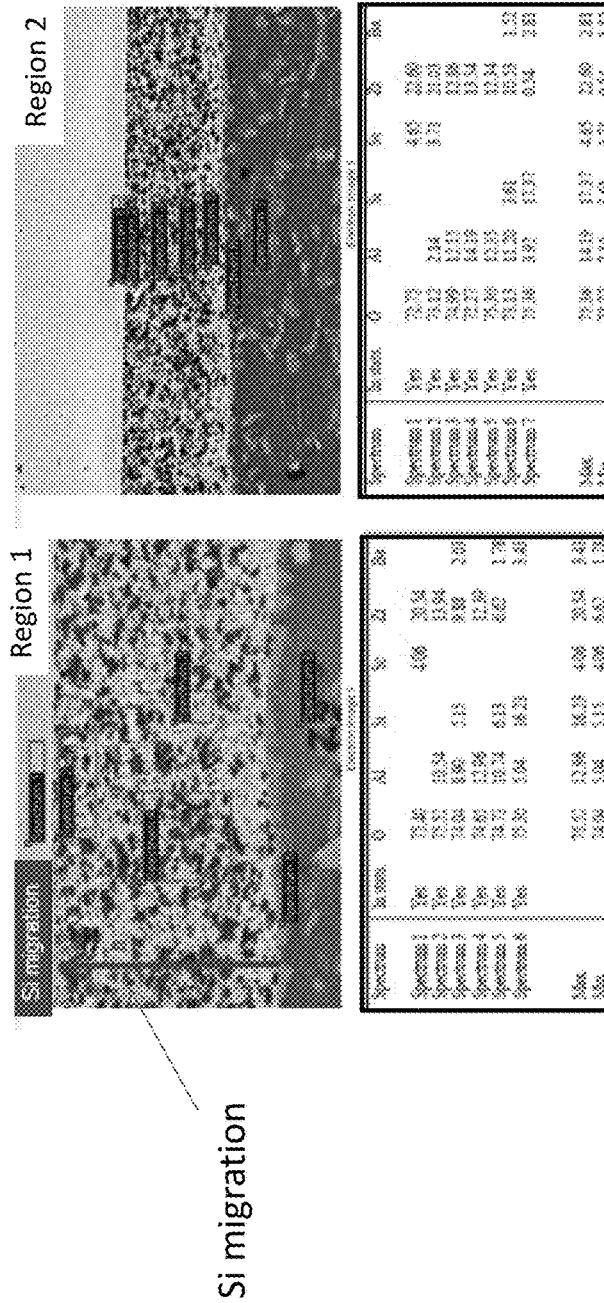

The upper left and right quadrants of FIG. 7B show SEM images of the microstructure of an electrolyte reinforcement (ERI) layers formed at two different regions on a solid oxide electrolyte using the Example 2 ink composition and interfacing a glass seal. The lower left and right quadrants of FIG. 7B are spectra from energy-dispersive X-ray spectroscopy (EDX) analysis of points in the layers in the respective upper quadrants, similar to that in FIG. 6B.

As shown in the lower left quadrant of FIG. 7B, the addition of the cobalt oxide sintering aid improves the surface chemistry of the ERI layer and allows a greater amount and/or deeper infiltration of silicon from the glass seal into region 1 of the ERI layer than the microstructure of FIG. 6B, thereby improving the wettability and bond between the seal and the ERI layer.

Figures 8A, 8B:
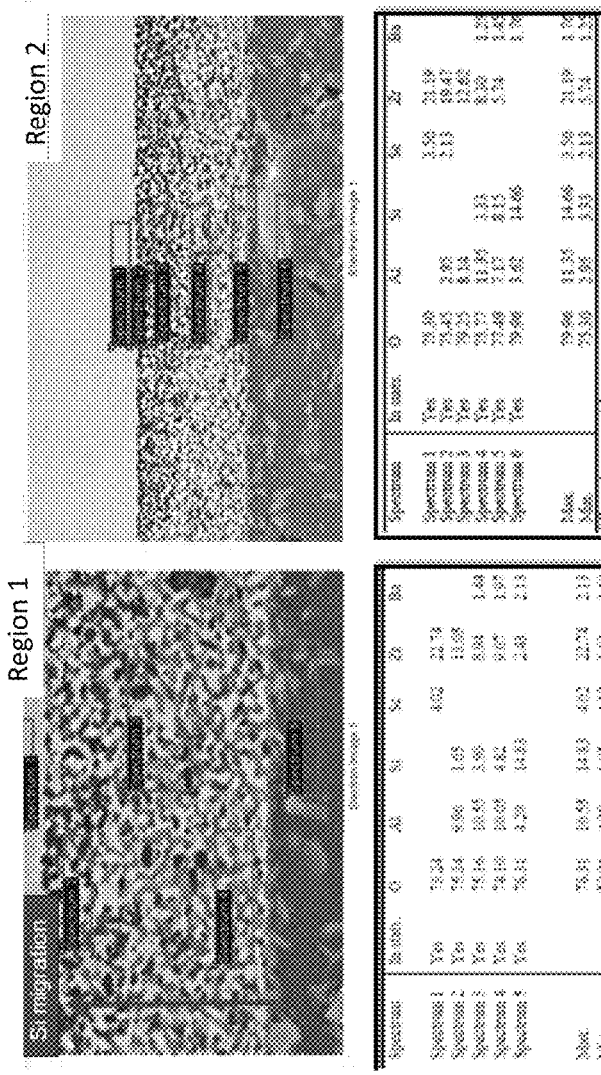

A third example (i.e., Example 3) of an embodiment ink composition for forming an electrolyte reinforcement layer is shown in FIG. 8A. The Example 3 ink composition includes 55.58 wt % YSZ, 18.80 wt % aluminum oxide, 1.20 wt % copper oxide, 1.19 wt % tin oxide, with the balance (23.23 wt %) including various solvents, binders, plasticizers and dispersants. Thus, the Example 3 ink composition includes two different metal oxide sintering aids (i.e., copper oxide and tin oxide).

The upper left and right quadrants of FIG. 8B show SEM images of the microstructure of an electrolyte reinforcement (ERI) layers formed at two different regions formed on a solid oxide electrolyte using the Example 3 ink composition and interfacing a glass seal. The lower left and right quadrants of FIG. 8B are spectra from energy-dispersive X-ray spectroscopy (EDX) analysis of points in the layers in the respective upper quadrants, similar to that in FIG. 6B.

As with the Example 2 composition, the addition of copper oxide and tin oxide sintering aids improves the surface chemistry of the ERI layer and allows a greater amount and/or deeper infiltration of silicon from the glass seal into the ERI layer, thereby improving the wettability and bond between the seal and the ERI layer.

Figure 9:
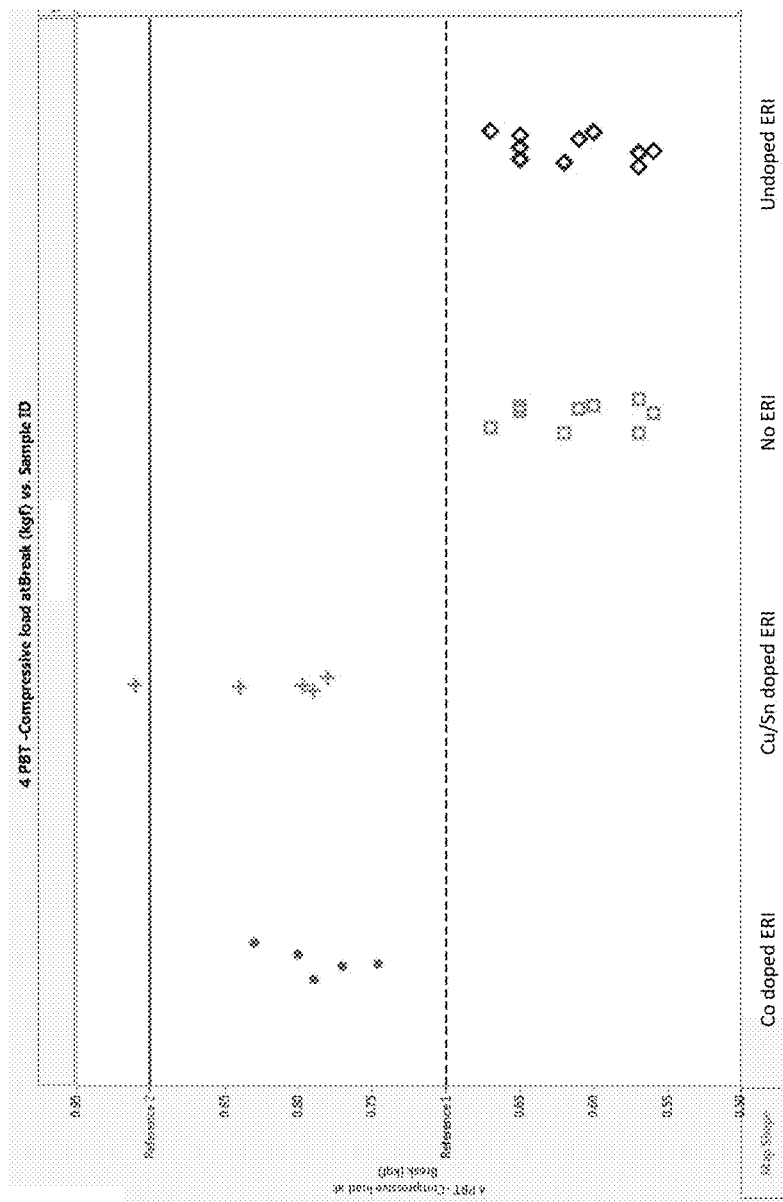
FIG. 9 is a graph of SOFC compressive load break performances for ERIs with varying metal dopants, an embodiment of an ERI disclosed in prior art, and no ERI.

FIG. 9 plots the results of a 4-point bend test performed on solid oxide electrolyte samples. A first group of electrolyte samples (indicated by dots) included an ERI layer formed with a sintering aid (i.e., dopant) comprising cobalt. A second group of electrolyte samples (indicated by crosses) included an ERI layer formed with a sintering aid comprising copper and tin. A third group of electrolyte samples (indicated by boxes) included no ERI layer, and a fourth group of electrolyte samples (indicated by diamonds) included an ERI layer formed without a metal or metal oxide sintering aid (i.e., undoped ERI). As shown in FIG. 9, the electrolytes without an ERI layer and the electrolytes with an ERI that lacks a metal or metal oxide sintering aid exhibit similar performance in the bend test. However, when metal/metal oxide sintering aids such as Co, Cu, and Sn or their oxides are added to the ERI, the electrolyte's mechanical performance (e.g., compressive load to break) improves substantially. As shown in FIG. 9, the compressive load required to break an electrolyte sample with ERI doped with a metal/metal oxide sintering aid is at least approximately 0.75 kgf (e.g., 0.75-0.91 kgf), whereas the compressive load required to break an electrolyte without an ERI doped with a metal/metal oxide sintering aid is less than 0.70 kgf (e.g., 0.55-0.68 kgf).

Figure 10:
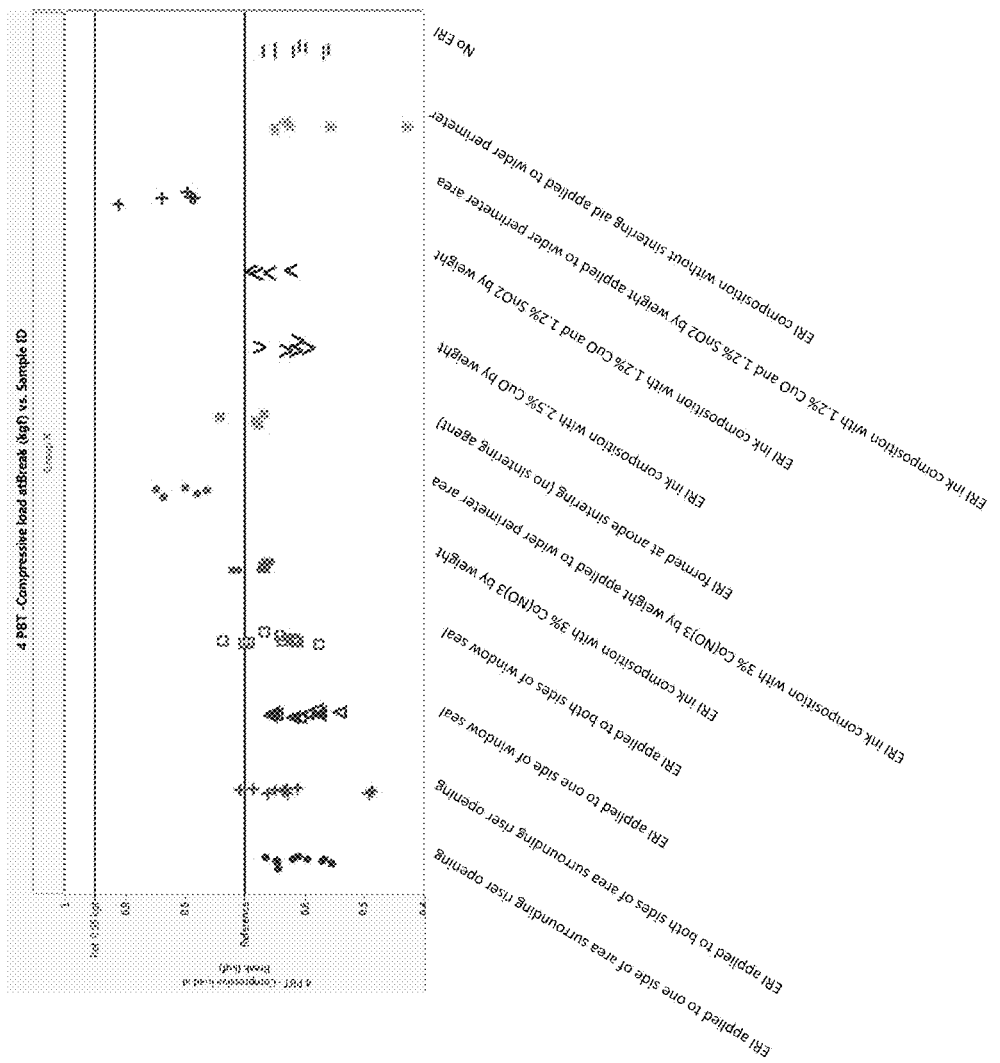
FIG. 10 is a graph of SOFC compressive load break performances for various compositions and locations of ERI ink.

FIG. 10 plots the results of a 4-point bend test for various exemplary ERI layer compositions and comparative examples as follows from left to right: ERI layer applied to one side of electrolyte near riser opening, ERI layer applied to both sides of electrolyte near riser opening, ERI layer applied to one side of electrolyte at window seal area (i.e., peripheral area), ERI layer applied to both sides of electrolyte at window seal area (i.e., peripheral area), ERI layer doped with cobalt according to an embodiment, ERI layer doped with cobalt layer applied to a wider perimeter area according to an embodiment, ERI layer without sintering agent formed at anode sintering, ERI layer doped with copper according to an embodiment, ERI layer doped with cobalt and tin according to an embodiment, ERI layer doped with cobalt and tin applied to a wider perimeter area according to an embodiment, ERI layer without sintering aid applied to a wider perimeter area, and electrolyte without ERI layer. The ERI applied to a "wider perimeter area" comprises an ERI layer 300 having a width of about 6-10 mm, such as 7-9 mm applied around the entire perimeter 30 of the electrolyte 5 (e.g., as shown in FIG. 5C or 5F).

The break point for electrolyte samples with ERI applied to one side of the area surrounding the riser opening generally falls between 0.55-0.68 kgf. The break point for electrolyte samples with ERI applied to both sides of the area surrounding the riser opening generally falls between 0.60-0.71 kgf, with some outliers at about 0.50 kgf. The break point for electrolyte samples with ERI applied to one side of the window seal generally falls between 0.52-0.66 kgf. The break point for electrolyte samples with ERI applied to both sides of the window seal generally falls between 0.55-0.74 kgf. The break point for electrolyte samples with ERI composition with 3% Co(NO)₃ by weight generally falls between 0.55-0.72 kgf. The break point for electrolyte samples with ERI composition with 3% Co(NO)₃ by weight applied to a wider perimeter area generally falls between 0.75-0.85 kgf. The break point for electrolyte samples with ERI formed at the anode sintering (that is, without a sintering agent) generally falls between 0.66-0.74 kgf. The break point for electrolyte samples with ERI composition with 2.5% CuO by weight generally falls between 0.58-0.68 kgf. The break point for electrolyte samples with ERI ink composition with 1.2% CuO and 1.2% SnO₂ by weight generally falls between 0.62-0.68 kgf. The break point for electrolyte samples with ERI composition with 1.2% CuO and 1.2% SnO₂ by weight applied to a wider perimeter area generally falls between 0.76-0.91 kgf. The break point for electrolyte samples with ERI composition without sintering aid applied to a wider perimeter area generally falls between 0.42-0.66 kgf. The break point for electrolyte samples without ERI generally falls between 0.55-0.67 kgf. One result of note is that the ERI layer may be particularly beneficial when it contains sintering aids and is applied to a wider perimeter area. The ERI of embodiments may thus provide better reinforcement for thinner electrolytes, in at least one case over 90 kgf.

The increased strength of SOFC electrolyte allows these thinner electrolytes to benefit from reduced crack propagation during handling and manufacturing at co-fired electrolyte and electrode temperatures and during the sintering of the SOFC components. For example, the increased bend strength leads to more consistent and predictable SOFC behavior, thereby reducing the risk of catastrophic failure resulting from cracked cells and/or ceramic defects. Furthermore, the deposition of the ERI layer may reduce the chances of cell breakage that may be cause by localized thermal gradients, thermal cycling, or high temperature sintering of components. The resulting cell with the appropriate strengthening perimeter ERI layer may thus improve overall yield of cells and stacks.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A solid oxide fuel cell, comprising:
   a solid oxide electrolyte;
   a cathode electrode over a first major surface of the solid oxide electrolyte;
   an anode electrode over a second major surface of the solid oxide electrolyte opposite the first major surface; and
   an electrolyte reinforcement layer over a portion of at least one of the first major surface and the second major surface of the solid oxide electrolyte, the electrolyte reinforcement layer comprising a ceramic material and at least one of a metal and a metal oxide sintering aid;
   wherein the electrolyte reinforcement layer comprises yttria-stabilized zirconia (YSZ), alumina and the sintering aid selected from Ti, Mo, W, Mg, Hf, Rh, Co, Ni, Fe, Mn, Cu or Sn metal or an oxide of Ti, Mo, W, Mg, Hf, Rh, Co, Ni, Fe, Mn, Cu or Sn.

2. The solid oxide fuel cell of claim 1, wherein the electrolyte reinforcement layer is located over the first major surfaces of the electrolyte and a second electrolyte reinforcement layer is located over the second major surface of the electrolyte.

3. The solid oxide fuel cell of claim 1, wherein the sintering aid comprises cobalt (II) oxide, or copper (II) oxide and tin (II) oxide.

4. The solid oxide fuel cell of claim 1, wherein the electrolyte reinforcement layer extends around a periphery of at least one of the first major surface and the second major surface of the solid oxide electrolyte.

5. The solid oxide fuel cell of claim 1, wherein the solid oxide electrolyte includes a fuel inlet riser opening and a fuel outlet riser opening, and the electrolyte reinforcement layer extends at least partially around a perimeter of the fuel inlet riser opening and at least partially around a perimeter of the fuel outlet riser opening on at least one of the first major surface and the second major surface of the electrolyte.

6. The solid oxide fuel cell of claim 1, further comprising a glass or glass-ceramic seal on the electrolyte reinforcement layer, wherein the electrolyte reinforcement layer comprises at least one component of the glass or glass-ceramic seal and wherein the at least one component of the glass or glass-ceramic seal comprises silicon.

7. The solid oxide fuel cell of claim 1, wherein the electrolyte reinforcement layer increases a bend strength of the solid oxide fuel cell compared to an identical fuel cell that does not include the electrolyte reinforcement layer; wherein the electrolyte reinforcement layer comprises 50-75 wt % of stabilized zirconia, 20-45 wt % of alumina, and 1-5 wt % of the sintering aid; and wherein the electrolyte reinforcement layer is located around the periphery of the electrolyte and at least partially around perimeters of fuel inlet and fuel outlet riser openings in the electrolyte.

8. The solid oxide fuel cell of claim 1, wherein the electrolyte reinforcement layer is located around an entire perimeter of the electrolyte and around a perimeter of fuel inlet and fuel outlet riser openings in the electrolyte, and wherein the electrolyte reinforcement layer is about 6-10 mm wide.

9. A solid oxide fuel cell, comprising:
   a solid oxide electrolyte;
   a cathode electrode over a first major surface of the solid oxide electrolyte;
   an anode electrode over a second major surface of the solid oxide electrolyte opposite the first major surface; and
   an electrolyte reinforcement layer over a portion of at least one of the first major surface and the second major surface of the solid oxide electrolyte, the electrolyte reinforcement layer comprising a ceramic material and at least one of a metal and a metal oxide sintering aid;

wherein the electrolyte reinforcement layer increases a bend strength of the solid oxide fuel cell compared to an identical fuel cell that does not include the electrolyte reinforcement layer;

wherein the electrolyte reinforcement layer comprises 50-75 wt % of stabilized zirconia, 20-45 wt % of alumina, and 1-5 wt % of the sintering aid; and wherein the electrolyte reinforcement layer is located around the periphery of the electrolyte and at least partially around perimeters of fuel inlet and fuel outlet riser openings in the electrolyte.

10. A solid oxide fuel cell, comprising:

a solid oxide electrolyte;

a cathode electrode over a first major surface of the solid oxide electrolyte;

an anode electrode over a second major surface of the solid oxide electrolyte opposite the first major surface; and an electrolyte reinforcement layer over a portion of at least one of the first major surface and the second major surface of the solid oxide electrolyte, the electrolyte reinforcement layer comprising a ceramic material and at least one of a metal and a metal oxide sintering aid;

wherein the electrolyte reinforcement layer is located around an entire perimeter of the electrolyte and around a perimeter of fuel inlet and fuel outlet riser openings in the electrolyte; and wherein the electrolyte reinforcement layer is about 6-10 mm wide.

* * * * *